United States Patent [19]

Reddick

[11] 3,800,089

[45] Mar. 26, 1974

[54] HANDS-FREE EMERGENCY TELEPHONE SYSTEM

[75] Inventor: Willis C. Reddick, Corinth, Miss.

[73] Assignee: International Telephone and Telegraph Corporation, New York, N.Y.

[22] Filed: Feb. 24, 1972

[21] Appl. No.: 228,981

[52] U.S. Cl. ................ 179/1 HF, 179/5 R, 179/179

[51] Int. Cl. ........................................... H04m 1/02

[58] Field of Search .......... 340/308; 179/1 H, 1 HF, 179/5 R, 100 R, 100 L, 179, 183, 2 A

[56] References Cited

UNITED STATES PATENTS

| | | | |
|---|---|---|---|
| 3,707,607 | 12/1972 | Reddick | 179/100 L |
| 1,533,515 | 4/1925 | Reynolds | 179/100 R |
| 2,214,101 | 9/1940 | Cumming | 340/308 |
| 2,129,345 | 9/1938 | Cover | 179/5 R |

OTHER PUBLICATIONS

"Emergency Call Box," The American City, January 1972, page 85

*Primary Examiner*—Kathleen H. Claffy
*Assistant Examiner*—Randall P. Myers
*Attorney, Agent, or Firm*—James B. Raden; Delbert P. Warner

[57] ABSTRACT

An all weather emergency-reporting telephone call box employing a hands-free communication system is provided. The call box uses a speaker and microphone coupled through electronic circuits which provide hands-free operation for voice reception and transmission. The housing is formed of heavy material in a configuration selected to minimize the opportunity for vandalism. Direct communications access to the emergency station can be gained by opening a door which operates a micro-switch and prepares the system for hands-free operation.

5 Claims, 8 Drawing Figures

HANDS-FREE EMERGENCY TELEPHONE SYSTEM

CROSS REFERENCE TO RELATED APPLICATIONS

The present invention relates to subject matter disclosed in U.S. Pat. No. 3,707,607 issued Dec. 26, 1972 to Willis C. Reddick, entitled "Hands-Free Emergency Call Box" and assigned to the same assignee as the present invention. It relates also to a design U.S. Pat. No. D 222,120 patented Sept. 28, 1971, in the name of George L. Payne and assigned to the assignee of the present application. Electronic circuits used in embodiments of the invention are disclosed a U.S. Pat. to George Galyas, B. Trok and E. J. Skogsburg, 3,609,564, issued Sept. 28, 1971, entitled "Comparison Circuit for Alternating Voltages". A design application relating to appearance features of the present invention was filed Dec. 8, 1971, Ser. No. 206,237 entitled Handsfree Emergency Reporting Call Box, in the name of Willis C. Reddick.

BACKGROUND OF THE INVENTION

Field of the Invention

This invention relates to a hands-free emergency reporting telephone and particularly to an emergency telephone call box employing a speaker and a microphone for hands-free voice communication where the speaker and the microphone are both prepared for operation when a micro-switch is operated by opening a cover door.

DESCRIPTION OF THE PRIOR ART

Emergency reporting and police and Fire call-box telephones presently in general use are operated with a handset and a hookswitch. Because the handset requires that it be held by the operator, he is not free to use both hands to cope with pending emergencies. In an extreme example, he must hold the door with one hand and the handset with the other.

Handsets are subject to various forms of vandalism. Most notably, their line cords can be cut and the handsets stolen. Handsets are often left off-hook which keeps the circuit serviced by the telephone in constant operation and thus reduces circuit utilization by the receiving station.

SUMMARY OF THE INVENTION

In view of the foregoing, an object of the invention is to provide means, in an emergency reporting call box, to enable communications to be established and maintained without physical contact with telephone apparatus beyond that required initially to connect the apparatus.

Another object of the invention is to provide an emergency reporting call box which presents reduced opportunity for vandalism.

A further object of the invention is to position a hands-free telephone set within a housing in a manner affording protection for the set.

The disadvantages referred to are overcome and the objects are attained by installation of hands free telephone equipment in accordance with the present invention in an emergency telephone call box housing. Embodiments of the invention are used in conjunction with a metal housing, generally a heavy casting, which is designed to reduce vandalism. A voice switched amplification system is included as part of the inventive equipment to enable hands-free operation. The speaker and microphone, as a part of this system, are placed behind protective walls through which small connecting holes have been drilled. The small connecting holes are offset from direct line with the speaker and the microphone to reduce accessability to probing tools from the outside of the housing while providing an acoustical air path to the transducers. A micro-switch to activate the system is mounted within the housing with its operating surface mounted flush with the housing to protect it from attack by vandals. The metal housing is formed of heavy metal in a protective design so that in combination with the hidden speaker and microphone, the offset connecting holes, and the protected micro-switch the system presents a reduce susceptibility to vandalism and other misuse.

Operation of the set is initiated by release of the micro-switch when a cover door is opened. The set will remain in electrical connection with the receiving station until release is initiated by closure of the door or release is provided at the central office. The door is spring biased to assure its closure upon release by the caller. Speech signals are transmitted to the central office and received from the central office without requiring the operation of additional switches. No handset is available to steal, vandalize or leave off-hook.

BRIEF DESCRIPTION OF THE DRAWINGS

The above mentioned and other features and objects of this invention and the manner of obtaining them will become more apparent, and the invention itself will be best understood by reference to the following description of an embodiment of the invention taken in conjunction with the accompanying drawings, in which.

DESCRIPTION OF PREFERRED EMBODIMENTS

Figure 1:
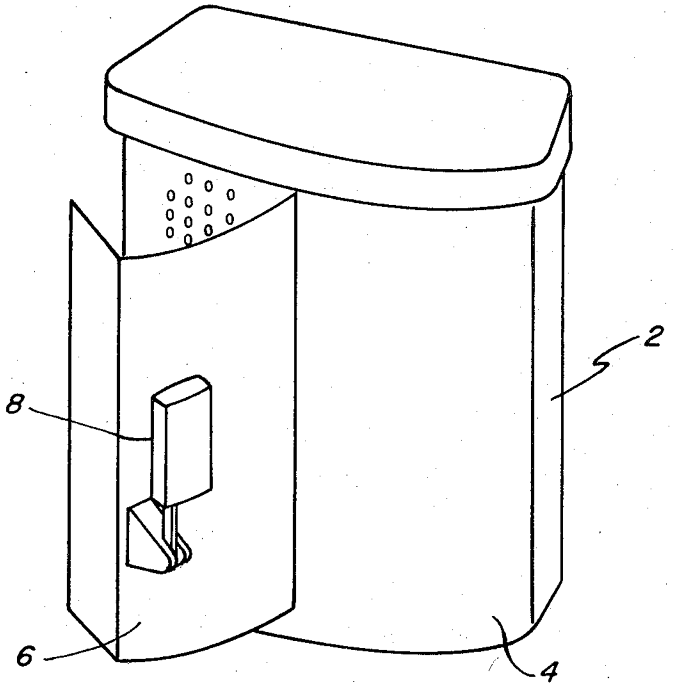
FIG. 1 is a perspective view showing an embodiment of the present invention completely assembled in a housing with a cover door shown open.

Turning first to FIG. 1, there is shown a housing 2 which is formed of heavy metal castings, or the like, to be relatively vandal free. An outer cover plate at 4 and a door at 6 form a protective face for the housing. A handle at 8 may be used to open and close the door. When the door is opened a microswitch is released to complete electrical connections for the hands free telephone circuits within the housing.

Figure 2:
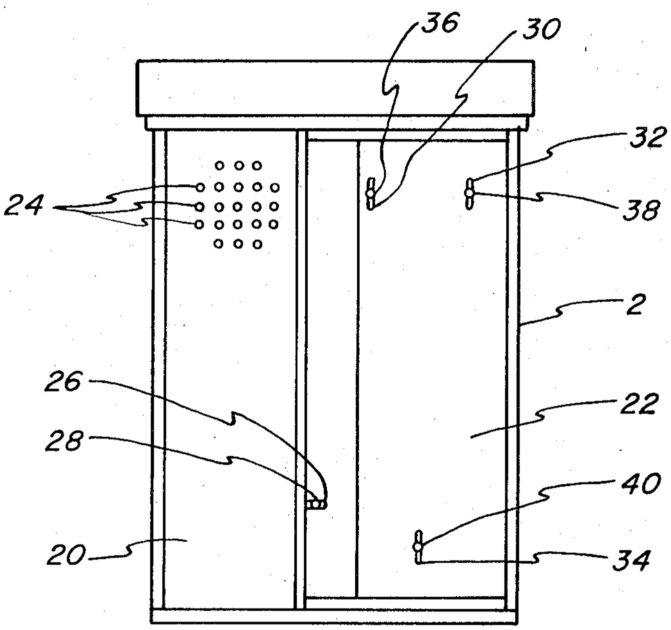
FIG. 2 is a front view of the embodiment of FIG. 1 with the cover plate and the door removed to disclose the face of a mounting plate and related elements.

FIG. 2 shows a front view of an embodiment of the invention according to FIG. 1, but with the outer cover plate 4 and the door 6 removed to disclose one face of a multiple faced mounting plate at 20 and the face of a cover plate at 22. The face of the mounting plate 20 includes a plurality of holes at 24 which serve as sound transmitting openings from a loudspeaker. An additional plurality of holes may be formed in a loudspeaker faceplate (not shown) and offset from holes 24 to reduce the opportunity for vandalism. An exemplary offset arrangement is shown in the above reference U.S. Pat. No. 3,707,607. An opening in the cover plate 22 at 26 provides access to the activator of a microswitch 28. Openings in the cover plate 30, 32 and 34 are provided to receive fasteners at 36, 38 and 40 which serve with braces (or studs) to fasten the cover plate to a portion of the mounting plate 20 which extends behind the cover plate 22.

Figures 3, 4, 5:
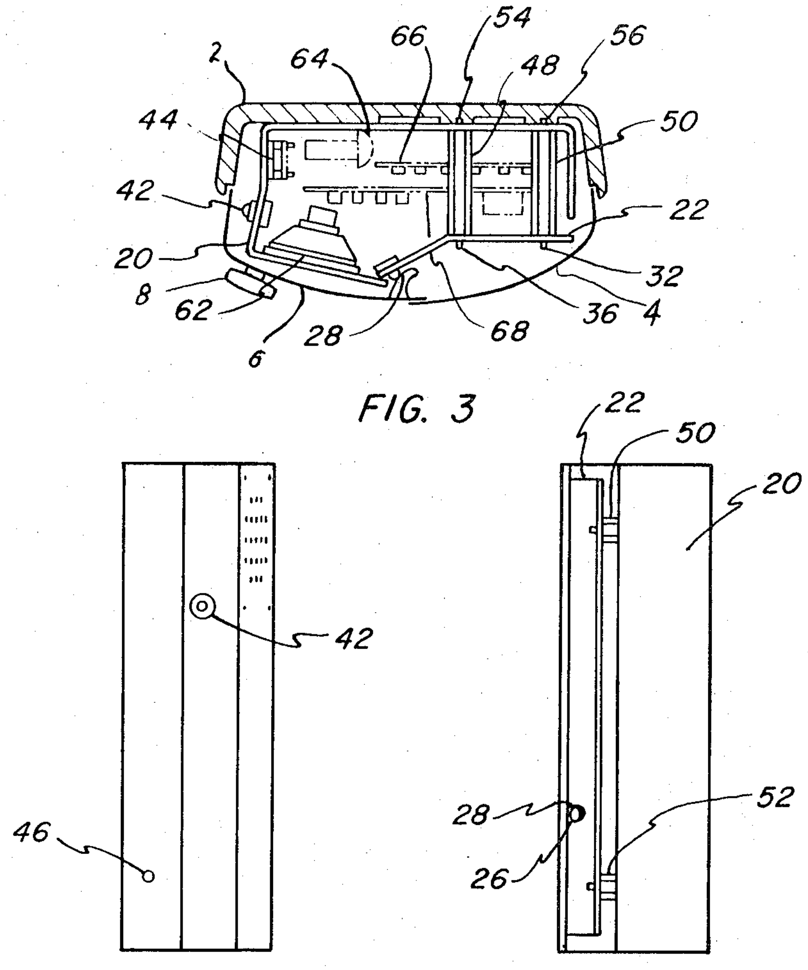
FIG. 3 is a top view of a preferred embodiment of the invention showing the form of the mounting plate with a cover plate and components attached and with the outer housing shown in section.
FIG. 4 is a view of the mounting plate taken from the left side of FIG. 3, with the outer housing removed.
FIG. 5 is an additional side view of the mounting plate as it would appear from the right side of FIG. 3, with the outer housing removed.

FIG. 3 is a top view of an embodiment of the invention showing how the mounting plate 20 has been formed to support and protect various components of a working hands-free telephone system within an outer casing formed by the housing 2, outer cover plate 4 and door 6. Various components shown in FIGS. 1 and 2 are repeated using the same reference numbers. The microswitch 28 is positioned to operate when the door 6 of the housing is opened. The microswitch, in operating, connects the hands-free station to a telephone line (not shown) which, in turn, may be connected to a particular line terminal in a central office.

A push button is illustrated at 42 in FIG. 3. This push button is available to enable manual selection of a connection (not shown) to an alternate station. The pushbutton is located out of sight in a protected position when the mounting plate is installed inside the housing 2. A microphone assembly at 44 will similarly be protected and hidden from view within the housing 2. The side view of FIG. 4 shows the position 46 of an opening communicating to the microphone 44. The location of the pushbutton switch 42 is also shown in FIG. 4.

Figure 7:
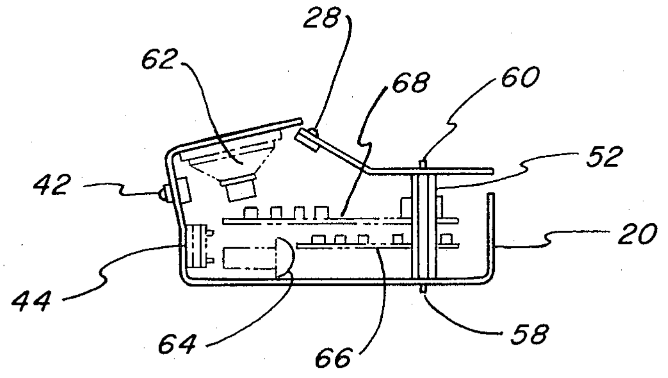
FIG. 7 is a bottom view of the mounting plate of FIG. 3, with the outer housing removed.

The cover plate 22 is fastened to the mounting plate 20 by spacer means in the form of studs 48, 50 and 52 which incorporate threaded portions at each end. The ends of the studs are secured by threaded mounting terminals indicated at 32, 36, 54 56, 58 and 60 (FIG. 7). Terminals 54, 56 and 58 are fastened directly through openings 55, 57 and 53 to internally threaded openings on the face of the housing 2. A number of communication elements are indicated by blocks in FIG. 3. These include the microphone 44, switches 28 and 42, a loudspeaker at 62, a ringer at 64 and various amplifier and other components on printed circuit boards at 66 and 68.

FIG. 5 shows a view of the invention with the outer covering removed as it would appear from the right side of FIG. 3. In this view further relationships are shown between the mounting plate 20, the cover plate 22 and two of the mounting studs 50 and 52. In this view the microswitch 28 is also shown from another viewpoint.

Figure 6:
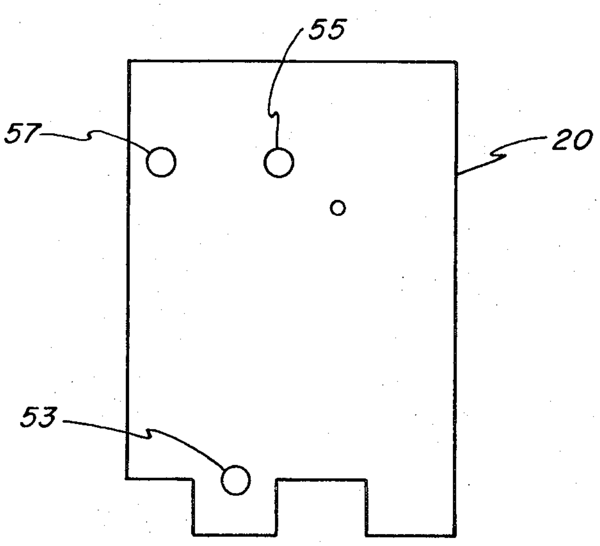
FIG. 6 is a back view of the mounting plate of FIG. 3, with the outer housing and connector elements removed.

The backview shown in FIG. 6 of the mounting plate 20 discloses openings at 55, 57 and 53 for receiving the threaded mounting terminals 54, 56 and 58 of the respective studs 48, 50 and 52. The openings 55, 57 and 53 are shown oversize so that the threaded mounting terminals can be inserted therethrough into threaded openings on a variety of cast housings 2.

Figure 8:
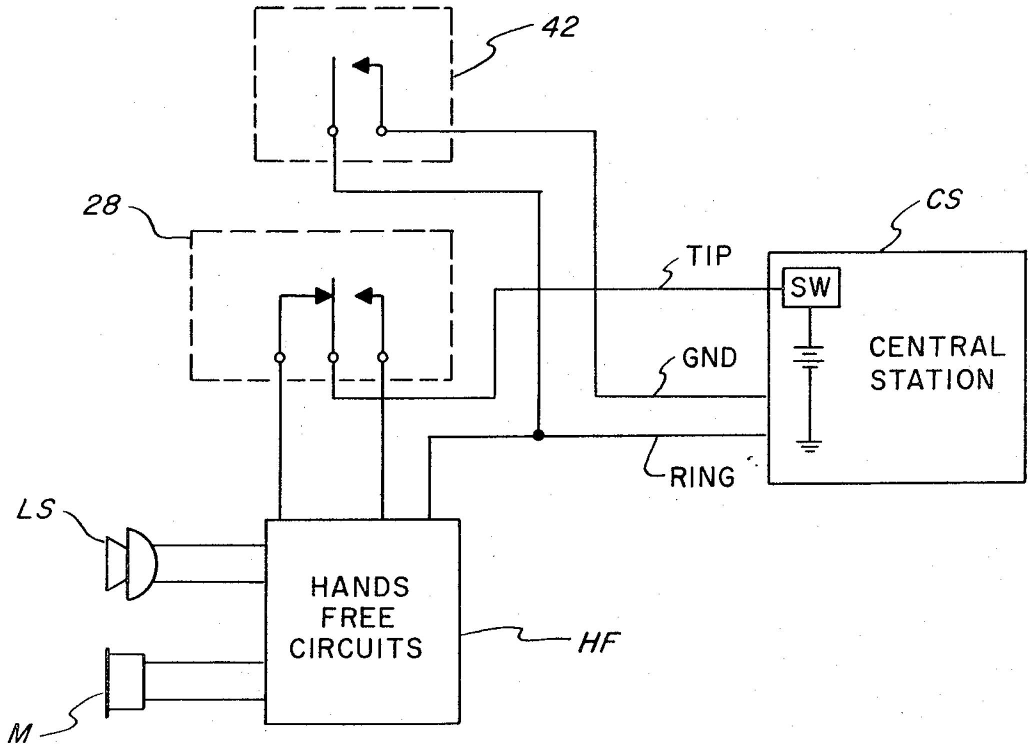
FIG. 8 shows exemplary electrical circuits of use in the practice of the invention.

The operation of circuits according to the present invention is controlled by either the microswitch 28 or the push-button switch 42. When the microswitch is operated by opening the cover door connections are completed, through operation of switch contacts or the like as indicated in FIG. 8, over a pre-connected telephone channel to a central office. Conversations are transmitted and received over the respective microphone and loudspeaker through operation of hands-free circuits HF of the kind disclosed in U.S. Pat. No. 3,609,564 of George Galyas, B. Trok and E. J. Skogsbert entitled "Comparison Circuits for Alternating Voltages" which issued on Sept. 28, 1971. When the conversations are over, disconnection is completed when the door of the call box shuts. The call box will usually be arranged through springs, or the like, to close when the handle is released. Release of a call or blocking of calls from the call box may be arranged also through operation of a switch SW in the central office. In the event a second control is supplied to the call box such as the button 42, the caller will be able to select from two circuits. The feature of automatic dialling, where installed, will enable the call box to establish connections through normal telephone circuits.

FIG. 8 is a block diagram representing electrical and electronic circuits which may be used in operating a call box in accordance with the foregoing discussion. The symbols 42,28, LS and M represents a pushbutton switch, a microswitch, a loudspeaker and a microphone, respectively.

To operate the circuit of FIG. 8, the caller opens the door of the call box which causes the microswitch 28 to complete a circuit through the hands-free circuits of block HF to a central station represented by the block CS. At this time, conversation may be conducted over the loudspeaker LS and the microphone M, via the hands-free circuits HF, with other lines coupled to the central station CS. In the illustration of FIG. 8, the circuits will remain operational until such time as the door is released and actuates the microswitch 28, or a party at the central station releases the circuit by operating a switch SW. A pushbutton 42 and connections may be located at the call box as indicated in FIG. 8 to enable a separate connection to a line terminal at a central station. A suitable automatic dialer may be interposed between the hands-free circuits and a dial exchange to enable connections to a central station over conventional telephone circuits.

While the principles of the invention have been described above in connection with specific apparatus and applications, it is to be understood that this description is made only by way of example and not as a limitation on the scope of the invention.

I claim:

1. A hands-free emergency telephone system comprising an outer housing forming an open-faced base for the support and protection of communication circuits, an outer cover plate fastened to said outer housing to form a protective cover over a part of the open face of said outer housing, a door hinged to said outer cover plate and positioned relative thereto to be operable to opened or closed positions through manual closure means, said door in its closed position forming a protective cover substantially over the remaining part of the open face of the outer housing, an inner housing formed by a multiple-faced mounting plate to which is attached an inner cover plate, said inner housing constituting a protective body containing means supporting communication circuits and components including electronic circuits, a microswitch, a microphone, a loudspeaker, and means connecting said microphone and said loudspeaker through said electronic circuits to first terminals of the microswitch, an opening in said inner housing providing access to said microswitch through said housing while preserving the protection to the microswitch afforded by said housing, said mounting plate supporting first electric terminal means connectable to lines terminating at a central office and to second terminals of said microswitch, means securing said inner housing within said outer housing and behind said outer cover plate and the door, said door covering access means to said microswitch and said door, when opened, permitting said microswitch to operate and complete electric connections between said microphone, said loudspeaker and said electronic circuits via the first and second terminals of the microswitch to the first electric terminal means, an opening through one face of said inner housing to permit acoustical coupling into the microphone, said outer housing substantially covering said one face to protect said opening and including space between said one face and said outer housing to enable acoustical coupling to be completed to said opening when the door is open, and a plurality of openings in said inner housing to permit acoustical coupling from the loudspeaker.

2. A hands-free telephone system as claimed in claim 1, in which a switch assembly is mounted on the side of said inner housing and under said outer housing to enable a connection to be made to a second electric terminal means connectable to lines terminating at a central office and to electric circuits involving said microphone, said loudspeaker and said electric terminal means.

3. A system as claimed in claim 1, in which a pushbutton switch is provided through the one face of said inner housing in a protected and partially hidden position, means are provided for connecting first terminals of said push button switch through electronic circuits to a microphone and a loudspeaker, and a second electric terminal is provided which is connectable to lines terminating at a central office and to second terminals of said push button switch.

4. A hands-free telephone system as claimed in claim 1, in which the micro-switch responds to release of pressure as the door is opened to establish connections for handsfree operation of said loudspeaker and said microphone.

5. A hands-free telephone system as claimed in claim 1, in which acoustical coupling from the loudspeaker is completed through a second plurality of openings located near the loudspeaker, said second plurality of openings forming an array out of alignment with the openings in the face plate and permanently fixed behind the face plate to permit acoustical coupling from the loudspeaker while providing protection to the loudspeaker from objects passing through the first plurality of openings.

* * * * *